United States Patent [19]
Langner et al.

[11] Patent Number: 5,805,625
[45] Date of Patent: Sep. 8, 1998

[54] LASER

[75] Inventors: Walter Langner, Ferdinand-Maria Strasse 20, D-82319 Starnberg; Wolfgang Deutscher, Munich, both of Germany

[73] Assignee: Walter Langner, Starnberg, Germany

[21] Appl. No.: 533,874

[22] Filed: Sep. 26, 1995

Related U.S. Application Data

[63] Continuation-in-part of Ser. No. 194,745, Feb. 9, 1994, abandoned.

[51] Int. Cl.$^6$ .......................................................... H01S 3/04
[52] U.S. Cl. ................................................................ 372/35
[58] Field of Search .................... 372/65, 34, 35, 372/92, 72

[56] References Cited

U.S. PATENT DOCUMENTS

| | | | |
|---|---|---|---|
| 3,413,567 | 11/1968 | Hannwacker et al. | 372/72 |
| 3,528,030 | 9/1970 | Bickel et al. | 372/72 |
| 3,659,220 | 4/1972 | Erickson | 32/35 |
| 4,232,276 | 11/1980 | Iwata | 372/35 |
| 4,233,567 | 11/1980 | Chernoch | 372/35 |
| 4,644,550 | 2/1987 | Csery et al. | 372/35 |
| 4,792,930 | 12/1988 | Kobayashi et al. | 372/35 |
| 4,852,109 | 7/1989 | Kuchar | 372/34 |
| 5,012,481 | 4/1991 | Casteleiro | 372/35 |
| 5,291,504 | 3/1994 | Bournes | 372/35 |
| 5,311,528 | 5/1994 | Fujino | 372/35 |
| 5,394,427 | 2/1995 | McMinn et al. | 372/35 |
| 5,475,702 | 12/1995 | August, Jr. et al. | 372/35 |

*Primary Examiner*—Leon Scott, Jr.
*Attorney, Agent, or Firm*—Smith-Hill and Bedell

[57] ABSTRACT

A laser suitable for operation in a power range above 0.5 watts comprises a compact housing block defining at least first and second recesses and formed with cooling fluid channels that debouch into the first recess. A pumping source and a laser crystal are mounted in the first recess of the laser housing and beam generating and beam guiding components are mounted in the second recess of the laser housing and define conduits that are connected to the cooling fluid channels.

33 Claims, 5 Drawing Sheets

LASER

CROSS-REFERENCE TO RELATED APPLICATION

This application is filed as a continuation-in-part of application Ser. No. 08/194,745 filed Feb. 9, 1994, now abandoned the disclosure of which application is hereby incorporated by reference herein.

BACKGROUND OF THE INVENTION

The invention involves a laser, in particular a solid state laser, with a pumping source, e.g. a pumping light, active material, in particular a laser rod, and at least one optical, electromechanical or mechanical component arranged in the extension piece of the active material, e.g. mirror, Q-switch, aperture, etc., as a laser resonator.

The above-named individual components of the laser have up to the present time been aligned on a rail as separate components. This requires that the laser have relatively large dimensions because of the relatively large alignment device. Moreover, the precision alignment device required for a precise mechanical alignment means increased costs for production, assembly and service.

SUMMARY OF THE INVENTION

The objective of the invention is to create a laser, which allows the laser components to be precisely aligned and held in a fixed position at a low cost.

According to the invention, the pumping source, the active material, the mirror, and beam generating and/or beam guidance components, as well as the laser cooling system, are all contained in a monolithic housing. The cooling system can be a coolant or cooling water circulating system. The cooling system is intended to cool the laser rod, the pumping source and other laser components.

The configuration is particularly suitable for medium to high-powered lasers in the range of from 0.1 watts to kilowatts. The configuration according to invention is intended for lasers in a power range of 0.1 to 150 watts.

The housing can be produced from a block by injection molding or by milling. Multiple blocks can also be produced in separate manufacturing operations, e.g. for accommodating the pumping source and the laser rod and for accommodating both mirrors, and then permanently bonded, welded or screwed together, resulting in a monolithic block. Plastic, especially fiber-reinforced plastic, or glass and ceramic or coated or protected metals are suitable as material for the housing. It can also be beneficial to locate additional components, such as the Q-switch, aperture, shutter, SHG element, etc. in the protecting housing to modulate and shape the laser beam. Beam guidance components outside the resonator, such as the beam spreader, focus mechanism, optical fiber coupling, deviating mirror and prisms, pilot beam sources, ergometers, observation systems, temperature compensators and the like, can also be located in the housing.

In another beneficial form of the invention, the housing is made out of a glass or ceramic that has a low temperature coefficient, so that a geometrically precise alignment of the laser resonator, especially the position of the optical components, can be maintained even under various temperature conditions.

It is also beneficial to introduce mechanical reinforcing elements in the form of rods or angles made of glass, reinforced plastic, glass ceramic or metal in a plastic housing so that the optical components can be fastened to them. In this way, the electrical insulating capacity and easy machinability of the plastic is combined with the mechanical and thermal stability of the geometric dimensions of the reinforcing elements. In the preferred form of the invention, the elements should be buffered against vibration in the housing.

Instead of glass ceramic rods, other mechanically stabilizing components, such as metal rods or angles, can be built into the longitudinal housing in an axial direction, if the housing is made out of plastic, poured into the housing or mechanically incorporated. The advantage of using angles for stabilization is that they increase rigidity and protect against torquing. The stabilizing components fix the position of the optical components in relation to each other because of the mechanical rigidity of the housing and/or a mechanical uncoupling between the carriers for the optical components and the housing.

Because of the invention, the laser can be produced in very compact dimensions and easily assembled. It is also easy to precisely align the laser resonator during production. Very high precision can be achieved by laser machining the manufactured housing blocks. Because of the elasticity of the monolithic housing block, its stability of form and vibration resistance, only major mechanical activity could subsequently knock it out of alignment.

In the monolithic housing, the wall thicknesses dividing the cavities inside the housing into various operational areas, such as pumping source, space for accommodating the laser rod and cooling water circulatory system, can be kept thin. This means that the way space is divided in the laser unit can be optimized. Screwing and alignment are not necessary, which means that savings in dimensioning, weight and material and thus also costs can be achieved. The laser resonator forms a strong, cohesive unit in a compact shape and is therefore insensitive to mechanical effects. It is also sealed against penetration by dust, water, vapor and oil. Service and maintenance can be kept to a minimum because of this sealed, compact design.

In the case of simpler applications, for which lower power stability and beam quality are required, the parts necessary to accommodate electrical, optical and mechanical beam guidance and sensor components are made of plastic.

In the case of solid state lasers, which can withstand only the slightest possible mechanical and thermal geometric variations in their mode structure, power stability, mirror alignment, and wave length (e.g. frequency doubling), the plastic housing is reinforced with fibers or material. Because the housing material has elastic properties, the resonator geometry readjusts itself shortly after the effects of deforming energy have been detected within the elastic limits. By choosing suitable reinforcing material, for instance glass ceramic, very slight thermal expansion of the material is obtained, so that the housing has great stability against mechanical or thermal effects, thus guaranteeing the geometry of the laser oscillator under heavy mechanical or thermal stresses.

The monolithic laser housing is particularly suitable for solid state lasers.

In the preferred form of the invention, a measuring system is provided with positioning sensors for mechanical or thermal, reversible or irreversible deformation. It is connected to a servo unit that automatically equalizes the position of the resonator components. All common electrical, optical or mechanical types of positioning sensors are suitable, for instance strain gauges. Reference marks, which in the preferred form of the invention are located in an optical channel inside the resonator, are monitored. The laser beam or a branched beam of the laser beam produced can be used as an optical measuring medium. This ensures that the reference marks are very accurately measured. In the preferred form of the invention, the distance between the optical components bordering the resonator is measured. It is sufficient to use only a very small part (less than 2 thousandths) of the laser beam for measurement, which means that there is, for all intents and purposes, no negative effect on the power of the laser beam itself.

In the preferred form of the invention, at least one outer component of the resonator is located on an adjusting element, which allows for axial shifting and even perhaps tipping over relative to the axis of the resonator. Any type of electromechanical converter can be used as this adjusting element, e.g. servos and stepping motors, bimetals or piezoelectric adjusting elements. A control unit is provided, by means of which adjustment signals for controlling the adjustment elements are derived from the measuring signals of the device that measures deformation. All the components for the measuring and adjustment systems are, in the preferred form of the invention, located inside the monolithic housing block. The electrical connections for the measuring system are routed to a plug arrangement on the outside of the block. In a particularly simple and cost-effective form of the invention, the measuring and adjustment systems are designed as purely mechanical elements. The design should be chosen so that temperature compensation can be self-activating.

In the preferred form of the invention, one wall of the housing block can be removed. The laser rod or crystal and the pumping source, as well as other optical components of the resonator, such as mirrors, apertures, and SHG elements, can then be assembled or disassembled radially, so that when one component is replaced, only that component has to be readjusted. In the preferred form of the invention, all the components of the cooling, measuring and adjustment systems are accessible when the wall is removed.

BRIEF DESCRIPTION OF THE DRAWINGS

Examples of the invention are described below in the schematic drawing.

DETAILED DESCRIPTION

Figure 1:
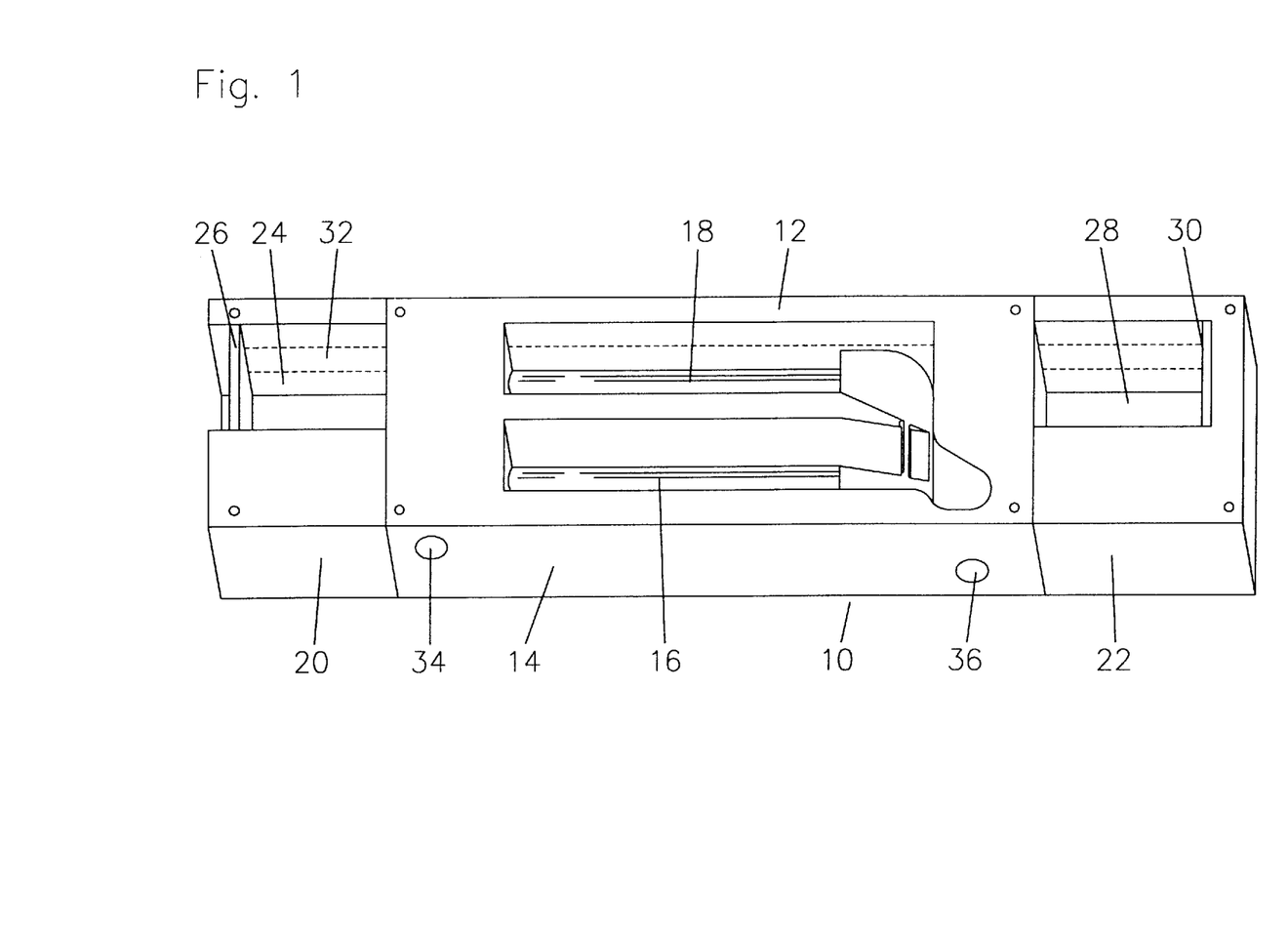
FIG. 1 shows one embodiment of a solid state laser with a compact plastic housing.

FIG. 1 shows a solid state laser 10 with a compact plastic housing 12. The plastic housing 12 consists of an initial housing part 14 for accommodating a pumping source 16 and a laser rod 18 and of two housing parts 20, 22 located on its front face, which are bonded together with the first housing part 14. The laser rod is arranged so that it can be removed from the housing either radially or axially. An advantage is that the housing can also be formed from a single block. The second housing part 20 contains, in the extension piece of the laser rod 18, a channel 24, whose end, open toward the front face, is closed off by a partially transmitting mirror 26 and which forms the first part of the laser resonator. There is also a channel 28 in the extension piece of the laser rod 10 in the third part of the housing 22, whose front face is formed by a totally reflecting mirror 30. Other components can, if necessary, also be located in the channels 24, 28. The reflective properties of the mirror are clearly related to the wave length of the laser light emitted. The laser light is intensified in the active material of the laser rod, e.g. Neodym-YAG, between the two mirrors 26, 30 that make up the laser resonator, so that part of the laser beam goes through the partially transmitting mirror 26.

FIG. 1 also indicates a glass ceramic rod 32 (dotted lines) that extends through all three parts of the housing 14, 20, 22 and connects both resonator mirrors 26, 30, and preferably also the laser rod 18, with each other. In the preferred form of the invention, this type of glass ceramic (e.g. Ceram) rod is located on both sides of the channels 24, 28 of the laser rod 18. These rods can be permanently cast into the plastic material or fixed in the plastic housing 12 safe from vibration because of elastic damping material. The Ceram rods 32 ensure that the laser rod resonator mirrors 26, 30 (and possibly other components too) are geometrically aligned with each other (and insensitive to temperature changes) in the housing.

A cover (not shown) can be screwed to the housing 12 which seals either only the first housing block 14 or all three connected housing block parts 14, 20, and 22 against the intrusion of dust, water and gas from outside. A separate cover for each housing part 14, 20, 22 could also be provided.

If the cooling water openings 34, 36 (shown from the side in the figure) and the electrical connections are routed onto one side, e.g. the front face, of the housing (in a method not shown), the laser can easily be mounted as a plug-in module on a premanufactured carrier device. The tightness of the housing, together with the high mechanical and thermal load-carrying capacity, means that the laser can be used in damp, sterile or otherwise dangerous conditions. Moreover, industrial applications in dusty or dirty working environments are possible because of the laser's insensitivity to dirt and vapor and its low maintenance.

The beam generation and guidance components can of course be arranged on edge in the housing block, which results in an abbreviated structure for the laser.

The solid state laser that is shown in FIGS. 2–6 comprises a compact monolithic housing block 40 which is made of plastic or aluminum, for example, and has transverse walls 42A–42E that define four recesses 52–58. Each recess 52–58 is open at the top of the housing block 40 and defines a service opening for the corresponding recess. The service openings are covered by separate covers 62–68 which are detachably mounted on the monolithic housing block 40. This enables easy exchange or maintenance of laser components in the respective recesses.

The housing block may be fabricated from three components 70, 72, 74 that are secured together by gluing at vertical separation planes. The three components each extend over the length of the housing block and are a major component block 72, in which the three recesses are formed, and two minor side pieces 70 and 74. Prior to gluing, the components 70 and 72 are milled at their mating surfaces to form grooves that extend longitudinally of the respective components, and bores 82–88 are drilled from the grooves in the major component block 72 into the recesses 52–58 respectively. When the components 70 and 72 are glued together, the grooves define longitudinal cooling fluid channels 76 and the bores provide communication between the cooling fluid channels 76 and the recesses.

The cooling fluid channels 76 are connected to cooling fluid connectors 80, which are attached to the housing block 40 at its end wall 42E. The connectors 80 can be connected to a source of an electrically insulating cooling fluid, such as deionized water, to establish circulation of cooling fluid through a cooling circuit that includes the channels 76. The bores 86 from the channels 76 debouch into the recess 56. The recess 56 is shaped so that the fluid is directed from the inlet bore and flows over the pumping source to the opposite end of the recess 56, where its direction of flow is reversed and the fluid flows over the laser crystal back to the outlet bore. Thus, the interior of the recess 56 is part of the cooling circuit. The bores 82, 84, 88 provide sealable connections between the channels 76 and components in the recesses 52, 54, 58 respectively. These connections allow cooling fluid to be supplied to components in the respective recess for cooling those components during operation of the laser.

Figure 2:
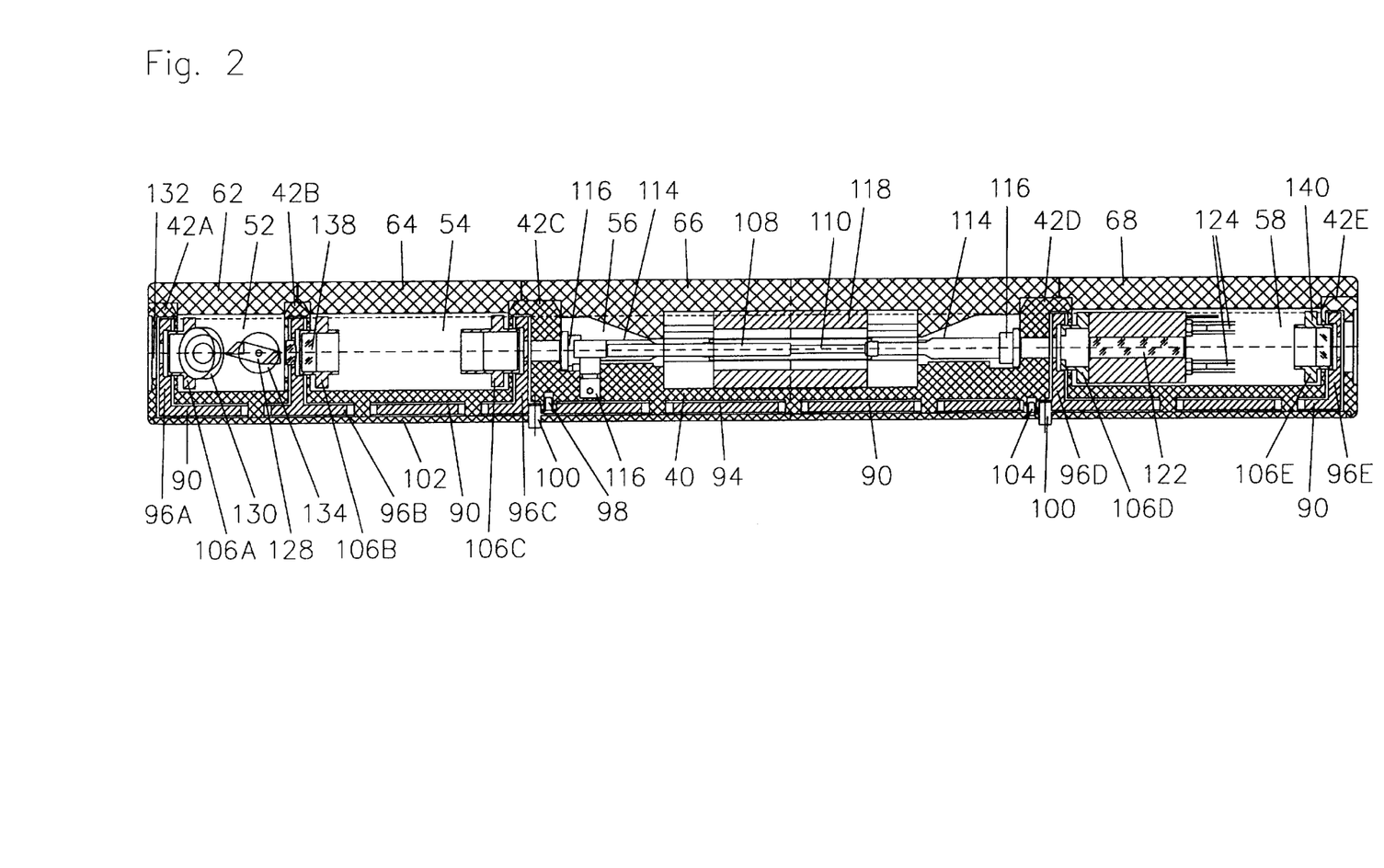
FIG. 2 shows a longitudinal vertical cross section of another embodiment of a solid state laser with a compact housing comprising cool fluid channels wherein fittings for laser components are detachably mounted.
Figure 3:
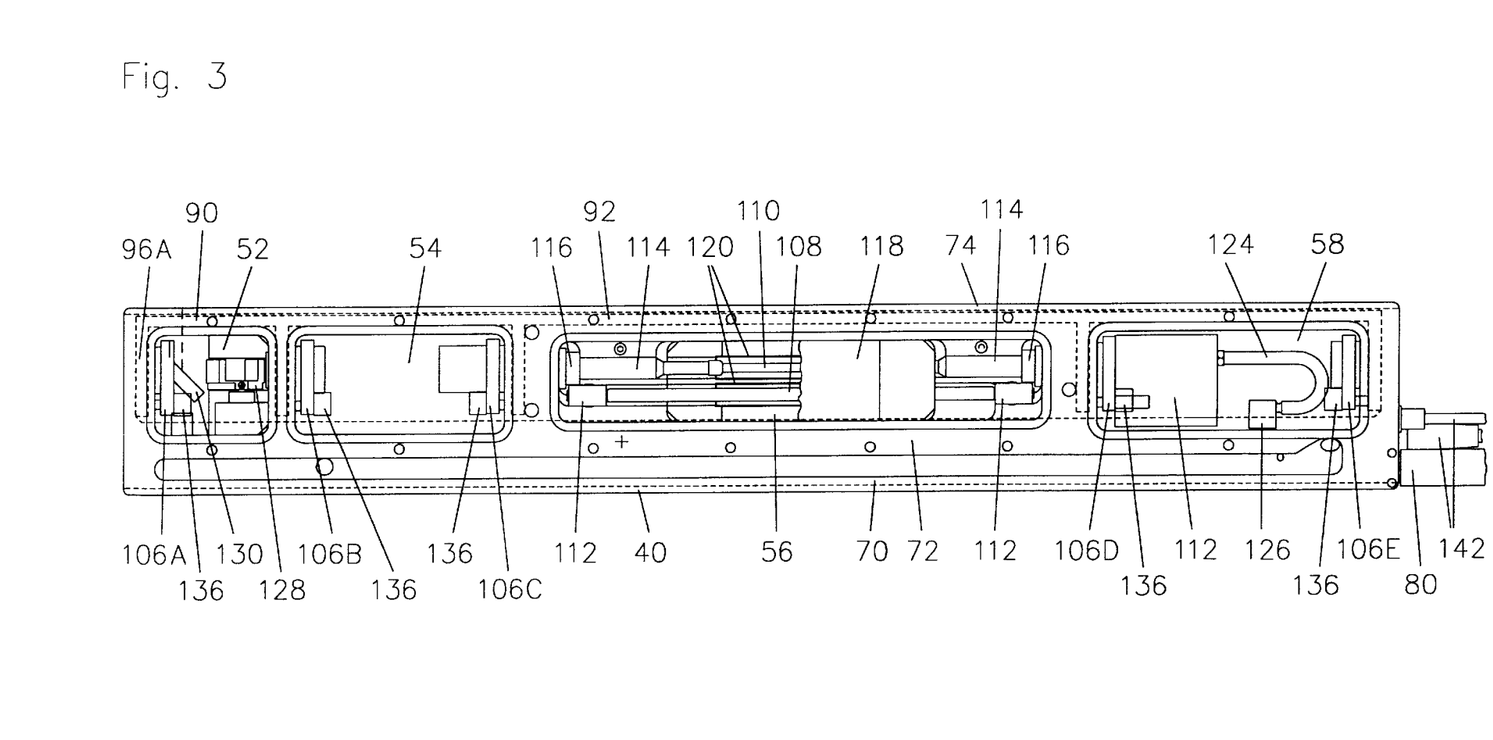
FIG. 3 shows a top view of the embodiment of FIG. 2 with covers of service openings being detached.
Figure 4:
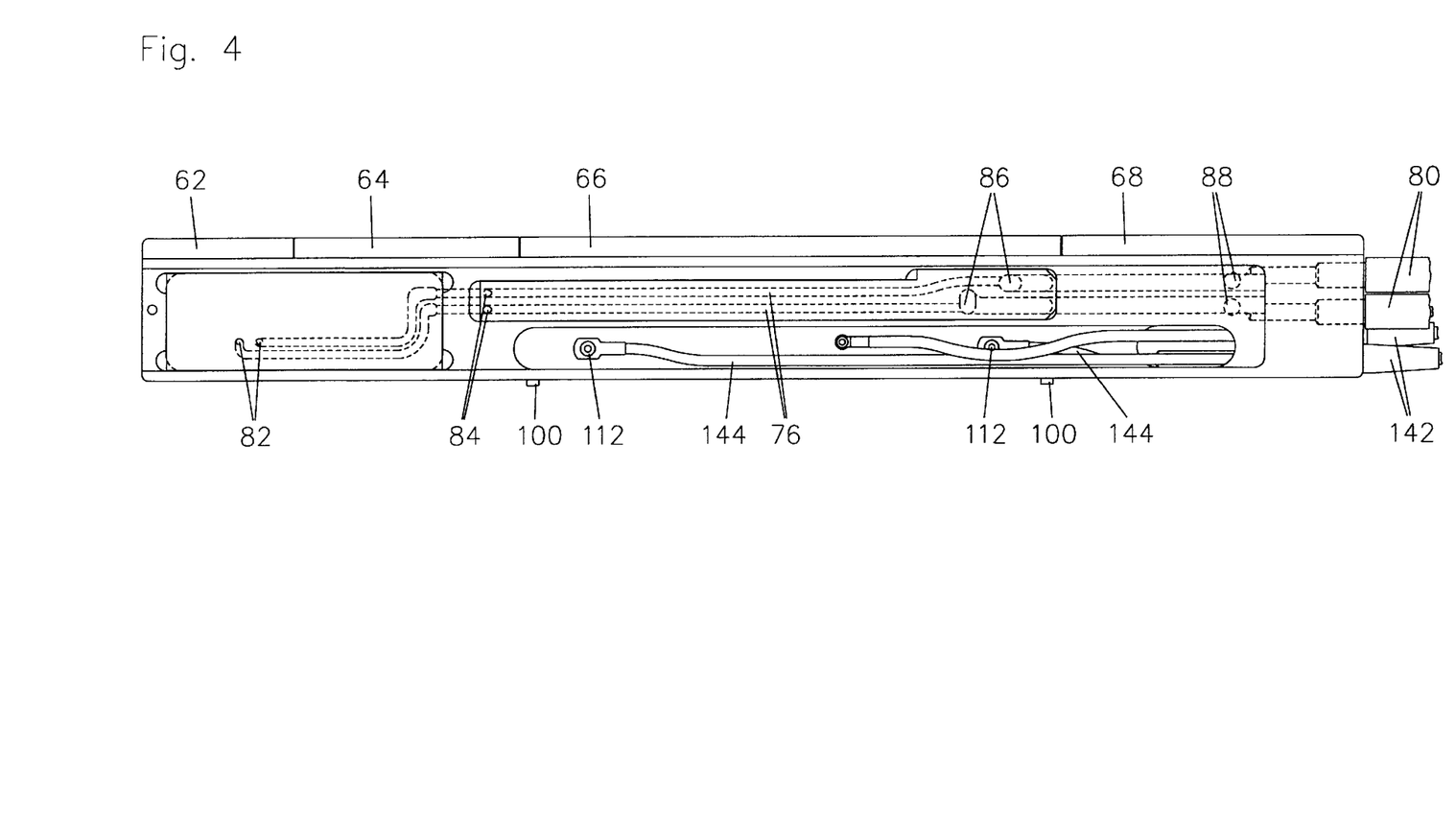
FIG. 4 shows a lateral view Z of FIG. 3.
Figure 5:
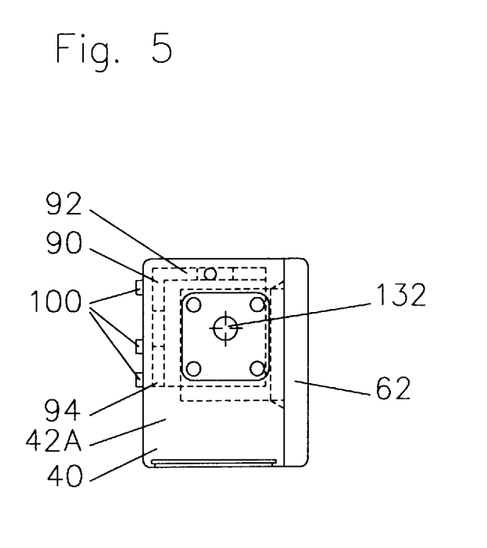
FIG. 5 shows a lateral view Y of FIG. 3.

FIGS. 2 and 3 show a mechanical bracing element 90. The mechanical bracing element 90, which may be made of steel, comprises a longtudinal vertical leg 92, a longitudinal horizontal leg 94, and transverse vertical webs 96A–96E joining the vertical leg and the horizontal leg. The horizontal leg 94 is divided into several segments like the teeth of a comb. The bracing element is installed by fitting the segments of the horizontal leg in channels that are defined between ribs in the base of the structure 70/72, and the transverse vertical webs 96A–96E are inserted in slots formed in the walls 42A–42E respectively of the housing block 40. The vertical leg 92 of the bracing element 90 is positioned against the side of the component 72 that is farther from the component 70, and the component 74 is then glued to the component 72, forming a slot in which the vertical leg is located. The bracing element is attached to the housing block by screws 98.

The horizontal leg 94 of the bracing element is formed with bores that receive mounting elements 100. A base plate 102 is attached to the housing block by screws 104 and by gluing, and the mounting elements 100 project through holes in the base plate 102 for supporting the laser in its operating disposition.

The mountings 106A–106E for various optical components of the laser, for example, mirrors, apertures, SHG (second harmonic generation) elements, polarization elements, beam splitters, shutters, etc., are attached to the transverse vertical webs 96A–96E of the bracing element. Each mounting 106 comprises a cylindrical sleeve having an external flange. The sleeve extends with a clearance through a hole in the housing block and is received in a cylindrical recess of the transverse web 96. As shown particularly in connection with the mounting 106C, the mounting is attached to the transverse web 96 by three screws that pass through the external flange and are angularly spaced at 120° about the beam axis and urge the external flange toward the vertical web.

The bracing element 90 is almost completely surrounded by an air gap about 1 mm wide. The manner in which the bracing element is installed in the housing block 40 provides good mechanical isolation with respect to the housing block 40, so that the bracing element is mechanically decoupled from the housing block over almost its entire length. Further, there is good thermal isolation between the bracing element and the housing block. Therefore, the bracing element is able to support the mountings 106 at precisely determined locations without the optical components that are attached to the mountings being thermally or mechanically influenced by the housing block 40.

The pumping source 108 and the laser crystal 110 are mounted in the longest recess 56, hereinafter referred to as the first recess. The pumping source 108 and the laser crystal 110 are generally cylindrical and are disposed parallel to the longitudinal axis of the housing block 40. The pumping source 108 is detachably mounted in the recess 56 by means of fittings 112 that project upward from the base of the recess 56. These fittings 112 also function as electrical connectors for the pumping source 108, as will be described in further detail below. Thus in this embodiment the pumping source may be easily exchanged by removing the cover 66 and removing the pumping source 108 by disengaging it from the fittings 112.

The laser crystal is aligned with openings in the walls 42C and 42D and is mounted in the recess 56 by virtue of its ends being received in bushings 114 that are sealed to the transverse walls 42C and 42D of the housing block by flanges 116. This arrangement ensures that the cooling fluid will not escape from the recess 56 through the openings in the walls 42C and 42D. In the middle of the recess 56 an elliptic reflector 118 is provided for focusing the radiation from the pumping source 108 onto the laser crystal 110. The laser crystal 110 and the pumping source 108 are surrounded by flow tubes 120 that improve flow of cooling fluid in the region of these components. The flow tubes 120 are made of glass and therefore do not significantly impair the function of the reflector 118.

A Q-switch 122 is located in the recess 58 and is secured to the mounting 106D. The Q-switch 122 is formed with cooling fluid conduits. Two fluid leads 124 that end in connections 126 connect the conduits in the Q-switch to the bores 88 so that these conduits are connected in the cooling fluid circuit.

An optical component located in the recess 54, such as the aperture shown in FIG. 2 between the mirror in the mounting 106B and the shutter in the transverse web 96B, or an SHG element, may be cooled by cooling fluid supplied through the bores 84.

In the recess 52, a shutter 128 is provided which is connected to the housing block 40 in a manner allowing rotation of the shutter 128 about a horizontal axis. By rotation of the shutter 128, two prisms located at the ends of a rotatable arm are moved into the laser beam so that the beam is reflected to an absorber plate (not shown) at the bottom of the laser housing. The absorber plate is cooled by means of cooling fluid fed to the absorber plate via connections to the bores 82.

At the forward end of the housing block 40, a mirror 130 is mounted on the mounting 106A at an angle of 45° with respect to the beam axis for coupling in a pilot beam or for splitting the beam generated by the laser into an axial partial beam which exits through an axial beam outlet 132 (FIGS. 2 and 5) and a lateral partial beam which exits through a lateral beam outlet (not shown).

The laser housing comprises an electromechanical position detection and controlling system 134 which is connected to a beam phase and position detection element which may be of known type and is located in the region of a beam opening in the intermediate walls 42B–42C or at the end walls 42A and 42E of the housing block 40. The data about the laser beam position and phase, provided by the beam phase and position detection element, is fed to the electronic position detection and controlling system which provides correction impulses to electromechanical actuators 136 which are attached to the mountings 106 for the optical resonator elements. The electromechanical actuators are actuated in such a way that phase shifts or aberrations of the laser beam caused by thermal expansion or mechanical impact are compensated.

The laser resonator comprises mirrors 138, 140 which are mounted on the mountings 106B and 106E respectively. The mirrors may be adjusted by means of the electromechanical position detection and controlling system.

Figure 6:
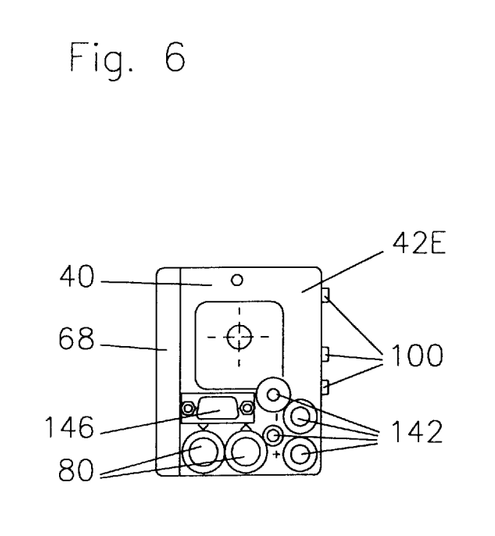
FIG. 6 shows a lateral view X of FIG. 3.

As may be seen from FIG. 6, at the end wall 42E of the housing block 40 there are four electrical connectors 142 that can be connected to an electric power supply. The connectors 142 provide electrical power for the pumping source by way of cables 144 that are connected to the fittings 112, and also provide electrical power for other components of the laser, such as the electronic position detection system and the electromechanical actuators 136. Further a data bus connector 146 may be provided for providing data relating to the electronic position detection and controlling system 134 and to the position of different beam guiding or beam shaping components, for example mirror 130, apertures etc.

It will be appreciated that the invention is not restricted to the particular embodiments that have been described, and that variations may be made therein without departing from the scope of the invention as defined in the appended claims and equivalents thereof. Thus it is possible to use different pumping sources, e.g. laser diodes. In this case the cooling leads are modified so as to provide an intensive cooling fluid flow over the cooling surface of the laser diodes.

We claim:

1. An improved laser suitable for operation in a power range above 0.5 watts, comprising:
    a laser housing which comprises a compact housing block formed with at least first and second recesses and with cooling fluid channels which debouch into the first recess,
    a laser crystal mounted in the first recess of the laser housing,
    a light emitting pumping source mounted in the first recess of the laser housing for pumping the laser crystal, and
    a beam modifying component mounted in the second recess of the laser housing and formed with a conduit connected to the cooling fluid channels for supplying cooling fluid to cool the beam modifying component.

2. A laser according to claim 1, wherein at least said first recess has an opening and the laser comprises a cover which is removably attached to the housing block for covering the opening, whereby removal of the cover allows at least the pumping source to be removed from the first recess.

3. A laser according to claim 1 comprising mounting fittings in said first recess for detachable mounting of the pumping source.

4. A laser according to claim 1, wherein the housing block is made of fiber-reinforced plastic.

5. A laser according to claim 1, wherein the housing block is made from glass, ceramic, or metal with an electrically insulating and non-corrosive surface.

6. A laser according to claim 1, further comprising a mechanical bracing element.

7. A laser according to claim 6, wherein the mechanical bracing element is substantially completely mechanically decoupled from the housing block.

8. A laser according to claim 7, wherein the bracing element comprises a first longitudinal leg, a second longitudinal leg disposed at right angles to the first longitudinal leg, and a plurality of transverse webs disposed at right angles to the longitudinal legs.

9. A laser according to claim 8, wherein the compact housing block has a transverse wall between the first and second recesses and the transverse wall is formed with a slot therein, and a transverse web of the bracing element is fitted in said slot.

10. A laser according to claim 6, wherein the laser crystal is connected to the bracing element.

11. A laser according to claim 1, wherein the housing block has first and second ends and the cooling fluid channels are provided with connections at the first end of the housing block.

12. A laser according to claim 11, comprising electrical connectors connected to the pumping source, the electrical connectors being at said one end of the housing block.

13. A laser according to claim 1, wherein the beam modifying component is a component for receiving a laser light beam emitted by the laser crystal and at least partially absorbing the laser light beam.

14. A laser according to claim 1, wherein the housing block is formed with at least a third recess and the laser further comprises a second beam modifying component in the third recess.

15. A laser according to claim 14, comprising a measuring and adjusting system for compensating for mechanical or thermal deformation, and wherein the second beam modifying component is mounted by means of a holding device which is responsive to the measuring and adjusting system.

16. A laser according to claim 14, further comprising a mounting member in the third recess of the laser housing for mounting the second beam modifying component in the third recess, the mounting member being formed with a conduit connected to the cooling fluid channels for passing cooling fluid for cooling the second beam modifying component.

17. An improved laser suitable for operation in a power range above 0.5 watts, comprising:
    a laser housing which comprises a compact housing block formed with at least first and second recesses and with cooling fluid channels which debouch into the first recess,
    a laser crystal mounted in the first recess of the laser housing,
    a light emitting pumping source mounted in the first recess of the laser housing for pumping the laser crystal,
    a beam modifying component, and
    a mounting member in the second recess of the laser housing for mounting the beam modifying component in the second recess, the mounting member being formed with a conduit connected to the cooling fluid channels for passing cooling fluid for cooling the beam modifying component.

18. A laser according to claim 17, wherein at least said first recess has an opening and the laser comprises a cover which is removably attached to the housing block for covering the opening, whereby removal of the cover allows at least the pumping source to be removed from the first recess.

19. A laser according to claim 17, comprising mounting fittings in said first recess for detachable mounting of the pumping source.

20. A laser according to claim 17, wherein the housing block is made of fiber-reinforced plastic.

21. A laser according to claim 17, wherein the housing block is made from glass, ceramic, or metal with an electrically insulating and non-corrosive surface.

22. A laser according to claim 17, comprising a mechanical bracing element to which the beam modifying component is mounted.

23. A laser according to claim 22, wherein the mechanical bracing element is substantially completely mechanically decoupled from the housing block.

24. A laser according to claim 23, wherein the bracing element comprises a first longitudinal leg, a second longitudinal leg disposed at right angles to the first longitudinal leg, and a plurality of transverse webs disposed at right angles to the longitudinal legs, and wherein the beam modifying component is mounted to one of said transverse webs.

25. A laser according to claim 24, wherein the compact housing block has a transverse wall between the first and second recesses and the transverse wall is formed with a slot therein, and a transverse web of the bracing element is fitted in said slot.

26. A laser according to claim 22, wherein the laser crystal is connected to the bracing element.

27. A laser according to claim 17, wherein the housing block has first and second ends and the cooling fluid channels are provided with connections at the first end of the housing block.

28. A laser according to claim 27, comprising electrical connectors connected to the pumping source, the electrical connectors being at said one end of the housing block.

29. A laser according to claim 17, comprising a measuring and adjusting system for compensating for mechanical or thermal deformation, wherein the beam modifying component is mounted by means of a holding device which is responsive to the measuring and adjusting system.

30. A laser according to claim 17, wherein the beam modifying component is a component for receiving a laser light beam emitted by the laser crystal and modifying the wavelength of the laser light beam.

31. A laser according to claim 17, wherein the recess is formed with at least a third recess and the laser further comprises a second beam modifying component mounted in the third recess.

32. A laser according to claim 31, wherein the second beam modifying component is formed with a conduit connected to the cooling fluid channels for supplying cooling fluid to cool said second beam modifying component.

33. A laser according to claim 31, wherein the second beam modifying component is a component for receiving a laser beam emitted by the laser crystal and at least partly absorbing the laser beam.

* * * * *